Oct. 22, 1968 — I. B. WEISE — 3,406,712
PRESSURE OPERATED SNAP ACTING VALVE
Filed May 24, 1965 — 2 Sheets-Sheet 1
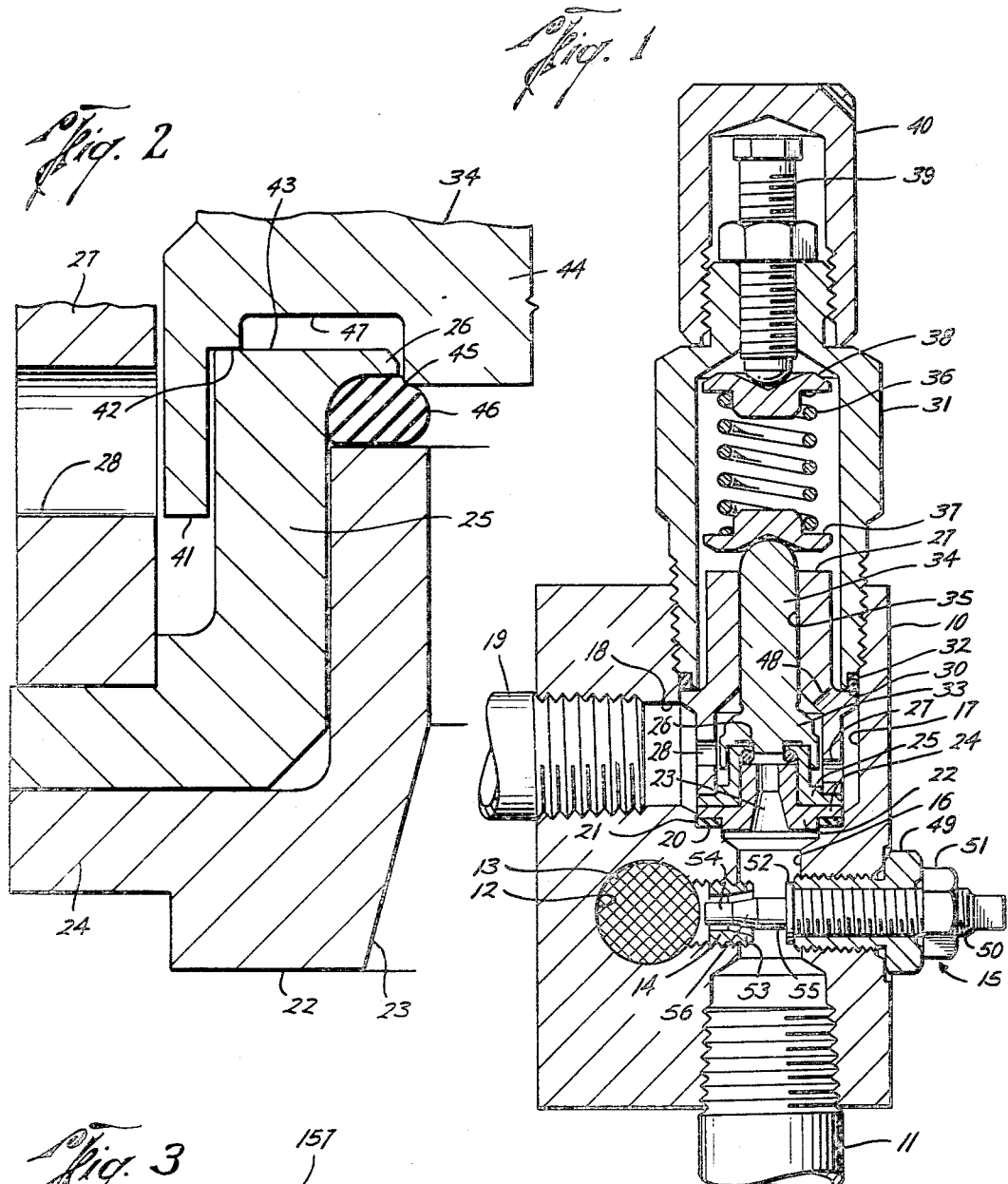
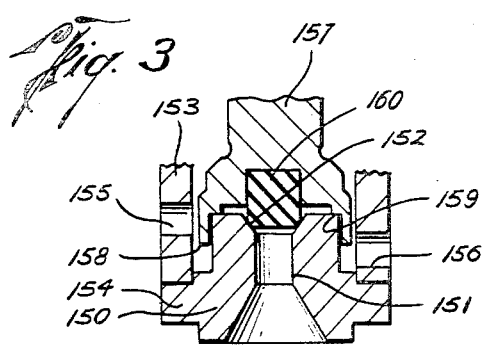
Irvin B. Weise
INVENTOR.
ATTORNEYS Oct. 22, 1968     I. B. WEISE     3,406,712
PRESSURE OPERATED SNAP ACTING VALVE
Filed May 24, 1965     2 Sheets-Sheet 2
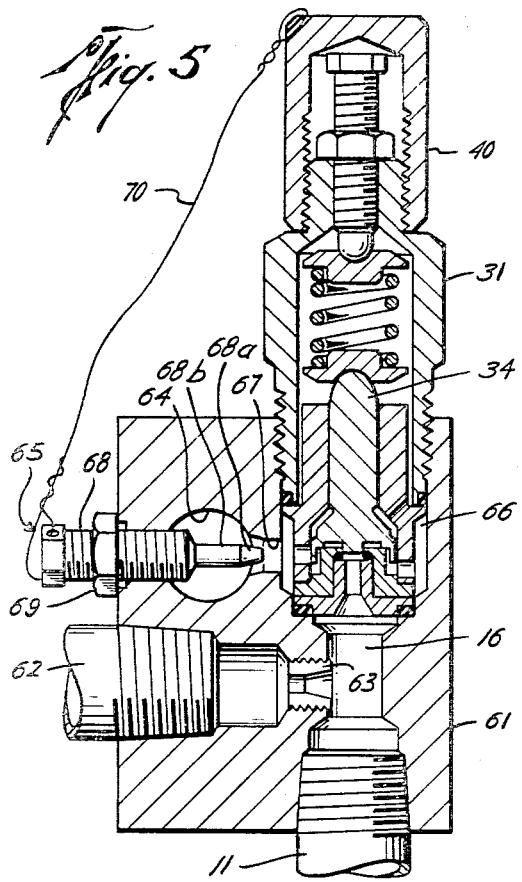
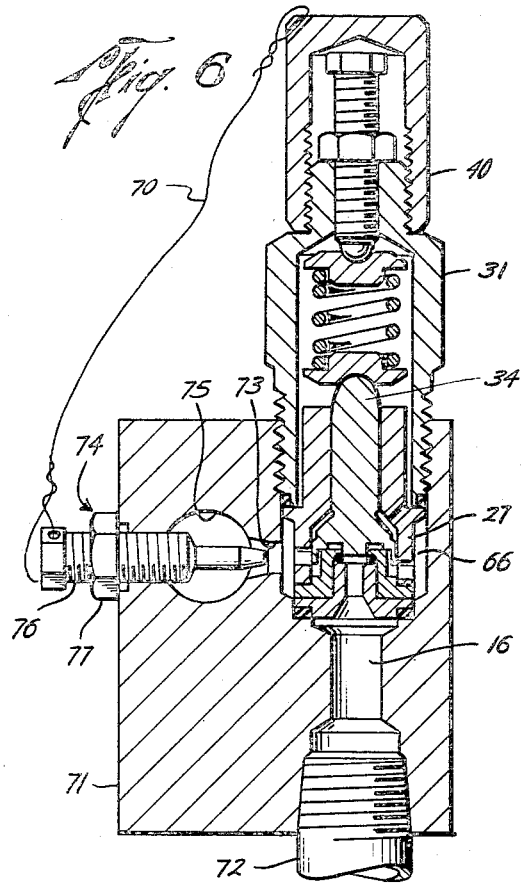
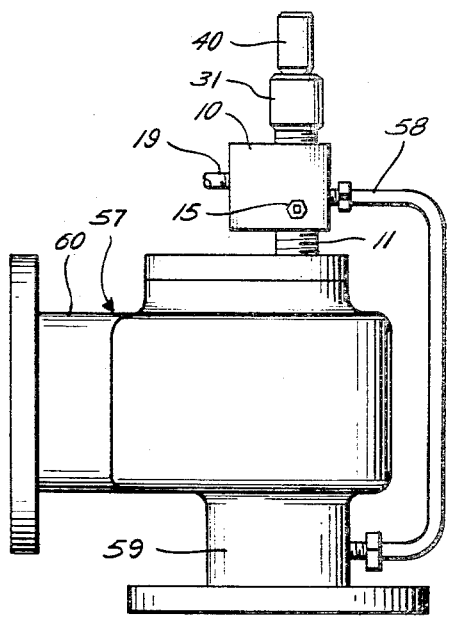
Irvin B. Weise
INVENTOR.
BY
ATTORNEYS United States Patent Office 3,406,712
Patented Oct. 22, 1968

3,406,712
PRESSURE OPERATED SNAP ACTING VALVE
Irvin B. Weise, Bellaire, Tex., assignor to Anderson,
Greenwood & Co., Houston, Tex., a corporation
of Texas
Filed May 24, 1965, Ser. No. 458,161
6 Claims. (Cl. 137—470)

ABSTRACT OF THE DISCLOSURE

This specification discloses a valve structure suitable for use as a relief valve or a pilot valve which provides snap action opening and closing and includes a nozzle defining a valve seat, a valve member adapted to engage the valve seat and a cage surrounding the valve member and defining a control port which port is restricted by the relative position of the valve member to control the pressure tending to seat the valve member. This abstract is neither intended to define the invention of the application which, of course, is measured by the claims, nor is it intended to be limiting as to the scope of the invention in any way.

---

The present invention relates to a relief valve structure. More particularly, the present invention relates to a relief valve which may be used as a pilot valve for a pressure relief or blowdown type of valve.

In the past pilot valves have been used with pressure relief valves to control the pressure delivered to the actuating member of the pressure relief valve. Specific reference is made to the prior application of the present inventor and Marvin H. Greenwood, Ser. No. 273,637 filed Apr. 17, 1963, now Patent No. 3,211,174. Such application illustrates a blowndown valve having a pilot valve controlling the pressure to the actuator of the main valve.

The function of a pressure relief valve is to protect a pressure system against overpressure by allowing a portion of the pressure fluid to flow out of the system to thereby reduce the system pressure. In such installations it is very desirable to be able to control the amount of fluid which escapes from the system and also to control the pressure in the system at which the relief valve closes. The primary requirement of such valves is that they open at the preselected pressure which will be a pressure above the system working pressure and the maximum pressure which is to be contained within the system. Control of the amount of blowdown or of the closing pressure of a relief valve must be accomplished by such means that will not affect the preselected relieving pressure.

One of the objects of the present invention is to provide a control for the amount of blowdown of a pressure relief valve without disturbing the opening pressure for such valve.

A further object is to provide an improved relief valve having means for controlling blowdown and reseating pressure of the valve.

Another object of the present invention is to provide an improved pilot valve assembly which may be used to control the actuation of a blowdown or pressure relief valve by a snap-action movement of the pilot valve in both directions responsive to the actuation pressure.

Another object of the present invention is to provide an improved pilot valve assembly which snaps open by exposing an enlarged area to the sensed pressure immediately upon a slight opening of the valve.

A further object of the present invention is to provide an improved pilot valve for a pressure relief valve in which the pilot valve moves in both directions with a snap action whereby efficient operation of the pressure relief valve results.

Still another object of the present invention is to provide an improved snap-acting pilot valve which will snap open at a predetermined sensed pressure and will snap closed at a substantially lower sensed pressure.

Another object of the present invention is to provide a snap-acting pilot valve having an improved, novel seat and adjustable restriction structures.

A further object of the present invention is to provide an improved pilot valve assembly which may be used to control the actuating pressure of a blowdown valve wherein the pilot valve moves by snap action in both directions responsive to the actuation pressure.

These and other objects are hereinafter more fully explained and described in reference to the drawings wherein:

FIGURE 1 is a vertical sectional view of the pilot valve assembly of the present invention.

FIGURE 2 is an enlarged vertical sectional view illustrating the novel seat of the pilot valve assembly of the present invention.

FIGURE 3 is a partial vertical sectional view of a modified form of the pilot valve assembly of the present invention.

FIGURE 4 is a schematic illustration of the pilot valve of the present invention installed on a main pressure relief valve.

FIGURE 5 is a vertical sectional view of another form of pilot valve assembly.

FIGURE 6 is a vertical sectional view of a pressure relief valve constructed in accordance with the present invention.

Referring more in detail to the drawings, the numeral 10 is used to designate the pilot valve body. The lower portion of the body 10 is drilled for connection of the pipe 11 which, in service as shown in the aforementioned patent application and in FIGURE 4, will communicate to the top side of the actuating member of the main valve. The port 12 in the body 10 provides fluid under pressure through the screen 13. Suitable connection may be provided from the port 12 to the main relief valve, and fluid from such valve will be conducted to the port 12. The restricted orifice 14, controlled by needle valve assembly 15 (hereinafter more fully described), provides communication from the port 12 to the chamber 16 into which the pipe 11 connects.

The upper portion of the body 10 is provided with a vertical bore 17 communicating with the horizontal bore 18. Pipe 19 extends from the horizontal bore 18 providing a vent conduit for the pilot valve assembly. The lower end of the vertical bore 17 provides an upwardly facing shoulder 20 which surrounds the upper portion of the chamber 16. Gasket 21 is positioned on the shoulder 20 to provide a seat for the nozzle 22. The nozzle 22 is provided with a central passageway 23 and an outwardly extending flange 24. The retainer 25 is positioned against the upper surface of the flange 24, surrounds the upper portion of the nozzle 22 and extends upwardly thereabove terminating in an inwardly directed lip 26.

Cage member 27 fits in the bore 17 and seats on the outwardly extending flange section of the retainer 25. The cage member 27 is provided with control port 28 and drain port 29. The upper exterior of cage 27 is provided with outwardly extending shoulder 30 which is engaged by the bonnet 31. A seal is provided by the seal member 32 against the shoulder 30 on cage member 27, against the exterior of the lower end of the bonnet 31 and against the interior of the bore 17. As readily seen from FIGURE 1, the upper end of the bore 17 is threaded to receive the bonnet 31 in threaded engagement.

The interior of cage 27 is enlarged in the area surrounding and above retainer 25 to receive the enlarged portion 33 of the valve member 34. The upper portion of the valve member 34 extends in close sliding fit with the upper bore 35 through cage 27. Spring 36 is positioned between the cups 37, 38. The cup 37 rests on that portion of valve member 34 which projects above cage 27 and, by virtue of the spring 36, will urge the valve member 34 downwardly toward its seated position, as hereinafter more fully described. The upper portion of bonnet 31 is provided with internal threads for receiving the adjusting screw 39 which, when rotated, will cause movement of the cup 38 to adjust the force exerted by the spring 36 on valve member 34. Protective cap 40 surrounds screw 39 and is threadedly engaged to the upper exterior of the bonnet 31.

Referring in detail to the enlargement of FIGURE 2, the valve member 34 is provided with a depending skirt 41 surrounding the upper exterior of the retainer 25 and extending downwardly to a position substantially covering the control port 28. The interior of the skirt 41 is recessed upwardly to the downwardly facing shoulder 42 which engages the upper surface 43 of retainer 25 when the valve member 34 is fully seated. The restricted annular flow passageway defined between the interior of the skirt 41 and the exterior of retainer 25 will have a substantially constant cross-sectional area in all positions of the valve member. The central portion 44 of the valve member 34 projects downwardly and the lower outer corner 45 will engage the resilient seating element 46 as clearly shown in FIGURE 2.

Such seating element 46 is annular in shape, circular in cross section and will be held in position between the upper surface of nozzle 22 and the lower side of the inwardly projecting lip 26 on retainer 25. It has been found that a resilient O-ring may be used for seating element 46. An annular recess 47 is provided between the central portion 44 and the shoulder 42 of the valve member 34. The outer diameter of the central portion 44 must of necessity be smaller than the inner diameter of the lip 26 so that seating corner 45 will engage the seating element 46 without engagement with the lip 26. The clearance between the outer diameter of central portion 44 and the inner diameter of lip 26 is relatively small as shown in FIGURE 2. As valve mmeber 34 is lifted, this clearance or flow area between portion 44 and lip 26 remains the same so that the seating element 46 is not extruded out into the flowing stream. This clearance thus functions as a restriction to the fluid flow downstream of the seating element 46 equalizing the pressure across the seating element during opening of the valve member to assure that the seating element is not damaged by the fluid flow. As stated above, this allows the use of a resilient O-ring for the seating element whereas without such restriction, a resilient O-ring would have a relatively short useful life as the seating element 46. Port 48 extends through cage 27 and connects from the interior of cage 27 to the interior of the bonnet 31 surrounding and above cage member 27.

The needle valve assembly 15 coacts with the restricted orifice 14 to control the flow from the port 12 into the chamber 16. The needle valve assembly 15 includes the gland nut 49 which is threaded into the pilot valve body 10, the adjusting needle 50 and the lock nut 51. The outer end of adjusting needle 50 is provided with wrench flats or other suitable means for rotating adjusting needle 50 in gland nut 49 to cause the needle 50 to move axially with respect to the restricted orifice. As shown, the needle 50 has external threads which engage with the internal threads of the gland nut 49. Flange 52 extends outwardly on needle 50 to provide a mechanical stop for limiting the movement of the needle 50 in both directions. For example, the flange 52, as shown, is against the inner end of gland nut 49 thereby preventing the needle 50 from further movement in the outward direction. Also, the flange 52 will engage the inner surface of the restriction 14 to prevent further inward movement of needle 50. It should be noticed that the slot 53 is provided in the inner end of restricted orifice member 14 so that the engagement of the inner end thereof by the flange 52 will not completely close the flow path from port 12 into chamber 16. With this flow path into chamber 16 at least always partially open, a flow of pressure fluid to chamber 16 and the actuating means of the main relief valve will be assured. The pressure in such actuating means will function to close the main relief valve.

The end of needle 50 which coacts with orifice 14 has an outer cylindrical section 54, an inner cylindrical section 55 of larger diameter than the diameter of section 54 and a tapered section 56 between sections 54 and 55. By a proper preselection of the sizes of sections 54, 55 and 56 in relation to the size of the opening through the orifice member, a sufficient pressure drop to assure opening of the main valve will occur even when the needle is moved to the position illustrated in FIGURE 1. The stop feature prevents an over pressure in the chamber 16 even when the needle 50 is misadjusted. The diameter of section 55 must be slightly smaller than the diameter of the opening through orifice member 14 to prevent complete closing of the flow path into chamber 16. Since chamber 16 is a pressure chamber, suitable packing should be provided around the needle 50 and around the gland nut 49.

The modified form of the invention illustrated in FIGURE 3 includes the nozzle member 150 which will be positioned in the body member substantially as the nozzle member 22 is positioned in the body 10 and provides a bore 151 and an upwardly facing valve seat 152 surrounding the upper end of the bore 151. The cage 153 is positioned on the flange 154 of nozzle member 150 and is provided with control port 155 and a drain port 156. Valve member 157 is substantially similar to valve member 34 and includes a depending annular skirt 158. The downwardly facing shoulder 159 is positioned immediately within the skirt 158 and a resilient seating plug 160 within the member 157 extends downwardly into engagement with the seat 152 when the valve member 157 is in its lowest position.

The schematic illustration of FIGURE 4 shows a valve, such as the valve illustrated in FIGURE 1, mounted atop a main valve 57 to function as a pilot valve controlling the actuating pressure for the main valve 57. The pipe 11 connects from the pilot valve into the top of the main valve 57 to provide communication to the actuating chamber above the actuating means. The line 58 provides communication between the inlet 59 of the main valve 57 and connects into the pilot valve to conduct the inlet pressure into the port 12 of the pilot valve. The exhaust pipe 19 may be vented to atmosphere or connected to the exhaust 60 for the main valve 57.

When the pilot valve 10 is closed, the pressure from the inlet 59 will flow through the line 58 and through the pipe 11 to be asserted against the actuating means (not shown) to maintain the main valve closed. When the pressure within the inlet 59 builds up in the chamber 16 to the preselected opening pressure, the pilot valve will open to exhaust the pressure fluid from the chamber 16 and the actuating chamber of the main valve 57 through the pipe 19 thereby allowing the inlet pressure to open the main valve and to exhaust pressure fluid through exhaust 60. When the inlet pressure as sensed in the chamber 16 is sufficiently reduced, the pilot valve will snap closed and allow the pressure to increase in the chamber 16 and in the actuating chamber of the main valve 57 to allow the main valve to close shutting off the blowdown. The operation of the pilot valve is hereinafter more fully explained.

In FIGURES 5 and 6 modified forms of the valve of this invention are shown. Many components of the valves illustrated in FIGURES 5 and 6 are identical with the components of the pilot valve illustrated in FIGURE 1 and, therefore, will be given the same numerals. Such components will not be described in detail except as is necessary to explain the different and distinguishing features of such valves. The body 61 of the valve, illustrated in FIGURE 5, is substantially similar to the body 10 in having the line 11 connecting into the chamber 16, but is provided with the line 62 connecting into the chamber 16 through the orifice insert 63 and the outlet port 64 including the needle valve assembly 65. The port 64 is in communication with the chamber 66 surrounding the cage 27 through the passageway 67. Needle valve assembly 65 includes a needle 68 having threads in engagement with the wall of the body 61, a tapering end 68a, a cylindrical section 68b extending from such threads with the exterior of the needle 68 being provided with a hex head, or other suitable gripping means, and a lock nut 69 on the exterior of the body 61 to lock the needle 68 in the desired position. From the foregoing, it can be seen that the needle valve assembly 65, by the adjustment of the needle 68 in relation to the passageway 67, will thereby adjust the outlet area from the chamber 66 to have the control on the operation of the device as hereinafter more fully explained. Locking wire 70 is secured to the hex head of the needle 68 and also to the top of the cap 40 to assure that both parts are not moved to change the preselected opening and closing pressures of the valve.

The valve mechanism illustrated in FIGURE 6 is a valve which would itself be utilized for the relief of pressure wherein it was desired to control the amount of blowdown in the pressure relief to be accomplished. The valve is provided with a body 71 in the form of a block similar to body 10. The pipe 72 connects into the chamber 16 from a vessel or other pressure system which is to be protected by the valve of FIGURE 6.

The chamber 66 surrounding the cage 27 is in communication through the passageway 73 and under control of the needle valve assembly 74 with the outlet passage 75. The needle valve assembly 74 includes the needle 76 having threaded engagement for axial movement in the wall of the body 71, an external hex head for ease of turning the needle 76 and a lock nut 77 to retain the needle in position once it has been properly adjusted. The inner end of the needle 76 coacts with the passageway 73 to provide a controlled restriction in the outlet from the chamber 66 whereby the control of the blowdown is accomplished as hereinafter more fully described and explained.

In operation the device of the present invention, as illustrated in FIGURE 1 and FIGURE 2, will be connected through the pipe 11 to the actuating chamber, such as the one for the actuating member of the main pressure relief valve 57, and through the port 12 to a source of fluid pressure, such as the inlet 59 of the valve 57. Pipe 19 will be connected to a suitable vent.

The pilot valve of the present invention may be used with other equipment requiring a valve to snap open responsive to a preselected opening pressure below the valve and to snap closed when the pressure below the valve falls below a preselected closing pressure.

When the device of the present invention is installed on relief valve 57 as illustrated in FIGURE 4, the fluid pressure from the vessel being protected is conducted through line 58, the port 12 and the restricted orifice 14 into the chamber 16. The flow from port 12 into chamber 16 is readily controlled by adjustment of the needle valve assembly 15 in relation to the orifice 14. Fluid pressure in the chamber 16 will be exerted through the pipe 11 to the actuating chamber of the main valve 57 and also through the passageway 23 in nozzle 22 to the area below the valve member 34 defined by the line of sealing engagement between the seating corner 45 and the seating element 46. When the fluid pressure in chamber 16 exerts a force on such area under the valve member 34 exceeding the force exerted on the upper end of the valve member 34 by the spring 36, the valve member 34 will rise. When sealing engagement between the seating corner 45 and the seating element 46 is broken, the fluid pressure from the chamber 16 will be exerted on the area under the valve member 34 and defined by the skirt 41. Thus, as soon as the valve member 34 lifts from its seat, the area exposed to pressure will be greatly enlarged and the valve member 34 will move to its uppermost of fully open position. At the instant the valve member 34 cracks open, the pressure on the underside of the valve within the skirt 41 will be larger than the pressure above the enlarged portion 33 of the valve member 34 within cage 27 because the small area between the interior of the skirt and the exterior of the retainer 25 will restrict the flow through such area resulting in a pressure differential across this restriction. This greater area provides an increased force which actuates the valve member 34 upwardly in a snap action.

After the valve is fully opened, the flow of fluids will build up a back pressure within the cage and the size of the ports 28 and 29 should be so designed to restrict the flow therethrough in a sufficient amount to allow back pressure to build up within the cage 27 and bonnet 31 while the valve is relieving. The length of the skirt 41 should be such that when the valve member 34 is fully opened, the control port 28 will be almost completely uncovered. As the back pressure in the cage 27 builds up, this pressure results in a downward force which adds to the force of the spring 36, both of which forces urge the valve member 34 towards its seated position. When the pressure in the chamber 16 is reduced to the point where the closing forces are greater than the lifting forces, the valve member 34 will commence downward movement towards its seated position. When this downward movement begins, skirt 41 will increasingly restrict the port 28 resulting in an increase in back pressure within the cage and bonnet. This results in an increased total downward force as the port 28 is increasingly restricted, and such downward force will increase to provide a snap-action movement closing the valve member 34 to its seated position as illustrated in the figures.

The pressure relationships on the valve member 157 illustrated in FIGURE 3 and the movement of the valve member 157 are the same as described for the valve member 34. The only difference in structure is that the device of the modified form of the invention, illustrated in FIGURE 3, utilizes the seating plug 160 rather than the novel seating corner 45 and seating element 46 illustrated in FIGURES 1 and 2. The forms of the invention are provided with a cage having at least one control port and a valve member having a skirt which, on movement of the valve member, will increasingly restrict or remove restriction to the flow through the control port in the cage during movement of the valve member. Such structure and function provide the positive snap-action movement desired in this type of pilot valve structures.

It should be noted that in all the forms of the invention which are to be used as a pilot valve, a restriction, such as the fixed restriction provided by the orifice insert 63 in the device illustrated in FIGURE 5 or the variable restriction provided by the coaction of needle valve assembly 15 with the restricted orifice insert 14, as illustrated in FIGURE 1, is necessary to limit the flow of supply pressure into the control chamber 16 to a rate substantially less than the rate at which it may be relieved through the valve device. In the valve illustrated in FIGURE 5, the primary restriction provided by the orifice insert 63 is not adjustable. Such restriction may be formed integral with the body rather than being an insert as shown. The degree of restriction is chosen so that during flow conditions a substantial pressure drop occurs across the orifice.

The needle valve assembly 65 coacting with the passageway 67 provides another restriction in the outlet of the valve assembly. Under flowing conditions the restriction provided by the needle valve assembly 65 may be varied and thereby vary the build up of back pressure within the cage 27 and the bonnet 31. Since this increase in back pressure resulting from the needle valve assembly restricting the passageway 67 directly affects the reseating pressure of the valve member 34, the control of the restriction by the needle valve assembly 65 may be utilized as a precise means of controlling the closing pressure of the pilot valve. The more restricted the passageway 67 is, the higher the reseat pressure of the valve member 34 and the less blowdown which will be allowed. With decreased restriction of the passageway 67 a greater degree of blowdown will be accomplished and the reseat pressure in the control chamber 16 will be lower. Since the adjustable restriction of the needle valve assembly 65 is located in the vent or outlet side of the valve illustrated in FIGURE 5, it is in an area which is normally at atmospheric pressure or very low pressure, and, therefore, is not normally under any pressure which requires effective seals to prevent leakage.

With regard to the valve device illustrated in FIGURE 6, this valve is a simple spring-loaded safety relief valve for use as a primary relieving device rather than as a pilot valve for a main relief valve. This valve is provided with the needle valve assembly 74 which cooperates with the passageway 73 to provide the variable outlet area whereby the control of the back pressure building up in the outlet of the valve will control the reseating pressure of the valve member 34 and also the amount of blowdown.

Both the valve structure of FIGURE 5 and the valve structure of FIGURE 6 operate to provide snap action in opening and closing as described in relation to the valve illustrated in FIGURE 1.

The valve of the present invention as illustrated may be used for either gas or liquid media. It may be used as a pilot valve in combination with the main relief valve or as a simple spring-loaded valve. Many valves of the prior art provide a satisfactory action when on gas service, but will not function when applied to a liquid pressure system. The prior valves when applied to liquid pressure systems frequently chatter or require a high degree of over pressure to achieve full capacity flow. The snap action of the valve of the present invention provides a full capacity flow for liquid or gas immediately upon initial valve opening.

From the foregoing it may be seen that the present invention has provided an improved valve structure for use as a relief valve or as a pilot valve for a pressure relief valve having a valve member which moves in both directions in a snap action. The valve member snaps open responsive to a preselected sensed pressure and snaps closed responsive to a pressure subtantially lower than such preselected sensed opening pressure. The device of the present invention provides novel structure assisting in the desired snap action in both directions and also provides a novel seating and variable restriction arrangement for the valve member. Also, the valve of the present invention provides a control on the amount of blowdown and a positive control of the fluid pressure into the control chamber below the valve member.

What is claimed is:

1. A valve assembly, comprising
a body having an inlet and an outlet,
said body defining a passage communicating between said inlet and said outlet,
a nozzle positioned in said body surrounding said passage,
said nozzle defining a seat,
a valve member,
a cage surrounding said valve member and defining a control port therethrough,
said valve member being movably positioned in said cage and adapted to engage said seat to close flow through said body passage,
means defining a first flow passage downstream of said seat having a substantially constant cross-sectional area in all positions of said valve member and through which fluids flow when said valve member opens slightly responsive to fluid pressure, such fluid pressure is exerted over a larger area of said valve member to move said valve member to full open position in a snap action,
means defining a second flow passage between opposite sides of said valve member in all positions of said valve member, and
means on said valve member coacting with said port to restrict flow through said control port,
the restriction of said port being a maximum when said valve member is seated on said seat and a minimum when said valve member is in fully open position whereby a slight closing movement of said valve member causes a restriction of flow through said port and an increase in pressure above said valve member within said cage to thereby snap said valve member to closed position on said seat.

2. A valve assembly according to claim 1, wherein said valve member includes,
a skirt depending from the outer periphery of said valve member,
said skirt surrounding and spaced outwardly from the exterior of said nozzle in all positions of said valve member to define said first flow passage.

3. A valve assembly according to claim 1, wherein the exterior of said valve member is spaced slightly from the interior of said cage to define said second flow passage.

4. A valve assembly according to claim 1, including
a resilient seating ring,
means supporting said resilient seating ring around said seat and defining an annular lip downstream of said ring, and
a projection on said valve member adapted to fit within said annular lip and engage said ring in a face seal
the space defined between said annular lip and said projection providing a restriction in the flow area downstream of said ring during initial opening movement of said valve member whereby pressure across said ring is substantially equalized.

5. A pilot valve assembly according to claim 1 including,
a passageway communicating from said control port to said outlet, and
an adjustable flow control means coacting with said passageway to control the flow through said passageway and vary the built-up pressure within said cage above said valve member existing while valve is open and flowing to thereby control the blowdown from the controlled area at which said valve member will close.

6. A valve assembly, comprising
a body,
said body having a passageway therethrough,
a valve seat defined in said body surrounding said passageway,
a valve member,
said valve seat and said valve member coacting to control fluid flow through said passageway,
means urging said valve member toward engagement with said valve seat, and
a cage surrounding said valve member and defining a control port,
said valve member having an outer annular depending skirt,
the exterior of said valve member being spaced slightly inward of the interior of said cage for flow of fluids between opposite sides of said valve member,
said skirt surrounding said valve seat in close spaced relationship thereto to define a restricted flow passageway downstream of said valve seat having a substantially constant cross-sectional area in all positions of said valve member,
said skirt restricting flow through said control port with a maximum restriction when said valve member is seated on said valve seat and a minimum when said valve member is in full open position, said skirt coacting with said valve seat whereby slight opening movement of said valve member from seated position exposes the larger area of said valve member defined by said skirt to fluid pressure to snap said valve member to full open position, said skirt coacting with said valve seat and said port whereby slight closing movement of said valve member from full open position restricts flow through said port to increase pressure on the side of said valve member away from said seat to snap said valve member to seated position.

References Cited

UNITED STATES PATENTS

| | | | |
|---|---|---|---|
| 769,512 | 9/1904 | Tippett | 137—475 |
| 921,360 | 5/1909 | Casey | 137—475 X |
| 2,170,500 | 8/1939 | Knowlton | 138—45 |
| 2,277,656 | 3/1942 | Falls | 137—478 |
| 2,328,132 | 8/1943 | Ernst | 137—475 |
| 2,364,812 | 12/1944 | Pierson | 137—469 |
| 2,597,057 | 5/1952 | Bergquist | 137—470 |
| 2,925,243 | 2/1960 | Griswold | 138—46 X |
| 3,074,425 | 1/1963 | Kikendall | 137—477 |
| 3,211,174 | 10/1965 | Weise | 137—469 |
| 708,039 | 9/1902 | Hellwig | 137—477 |
| 1,690,097 | 11/1928 | Ackermann | 137—470 |
| 1,972,435 | 9/1934 | Ackermann | 137—470 |
| 2,860,662 | 11/1958 | Gres | 137—469 |
| 2,875,978 | 3/1959 | Kmiecik | 137—469 XR |

WILLIAM F. O'DEA, *Primary Examiner.*

H. WEAKLEY, *Assistant Examiner.*